US011046463B1

(12) United States Patent
Dallmann et al.

(10) Patent No.: US 11,046,463 B1
(45) Date of Patent: Jun. 29, 2021

(54) COMPACT STAR-FIELD SENSOR (SFS)

(71) Applicant: Triad National Security, LLC, Los Alamos, NM (US)

(72) Inventors: Nicholas Dallmann, Los Alamos, NM (US); James Wren, Los Alamos, NM (US); Michael Proicou, Los Alamos, NM (US); Hannah Mohr, Los Alamos, NM (US); Jerry Delapp, Los Alamos, NM (US); Kimberly Katko, Los Alamos, NM (US); John Martinez, Los Alamos, NM (US); Donathan Ortega, Los Alamos, NM (US); Daniel Seitz, Los Alamos, NM (US); Paul Stein, Los Alamos, NM (US); Justin Tripp, Los Alamos, NM (US); Adam Warniment, Los Alamos, NM (US); Robert Wheat, Jr., Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 204 days.

(21) Appl. No.: 16/043,345

(22) Filed: Jul. 24, 2018

Related U.S. Application Data

(60) Provisional application No. 62/540,256, filed on Aug. 2, 2017.

(51) Int. Cl.
*B64G 1/36* (2006.01)
*G01S 3/786* (2006.01)
(Continued)

(52) U.S. Cl.
CPC ............. *B64G 1/361* (2013.01); *B64G 1/244* (2019.05); *G01S 3/7867* (2013.01); *G01S 5/163* (2013.01)

(58) Field of Classification Search
CPC ....... B64G 1/361; B64G 1/244; G01S 3/7867; G01S 5/163
See application file for complete search history.

(56) References Cited

U.S. PATENT DOCUMENTS 4,230,294 A 10/1980 Pistiner
4,425,813 A 1/1984 Wadensten
(Continued)

FOREIGN PATENT DOCUMENTS

CN 106843038 A * 6/2017 ........... G06K 9/0063
WO 2018120442 A1 7/2018

OTHER PUBLICATIONS

Liebe, "Accuracy Performance of Star Trackers—A Tutorial", IEEE Transactions on Aerospace and Electronic Systems, vol. 38, No. 2, Apr. 2002, pp. 587-599. (Year: 2002).*
(Continued)

*Primary Examiner* — Todd Melton
(74) *Attorney, Agent, or Firm* — LeonardPatel PC; Michael A. Leonard II; Sheetal S. Patel

(57) ABSTRACT

A compact SFS may can be deployed in small space vehicles. The SFS may have a small size, weight, and low power requirements. The hardware, software, catalogs, and calibration algorithm of the SFS provide highly accurate attitude information that can be used for pointing. For instance, accurate attitude determination may be provided that supports pointing of a deployable high gain helical antenna. A full "lost in space" attitude solution, accurate to about an arcminute, may be accomplished in under a minute. The SFS may be fully reprogrammable on orbit, allowing continued algorithm development and deployment after launch.

20 Claims, 8 Drawing Sheets

100
120
Sensor Board
Lens
122
110
130
Ribbon Cable
140
Processing Board
148
142
144
146
FSMC Bus
SPI
150
5V, 3.3V, 1.5V

(51) Int. Cl.
*G01S 5/16* (2006.01)
*B64G 1/24* (2006.01)

(56) References Cited

U.S. PATENT DOCUMENTS

| | | | | |
|---|---|---|---|---|
| 4,740,680 | A | 4/1988 | Frisch | |
| 5,698,842 | A | 12/1997 | Fallon et al. | |
| 8,772,690 | B2 * | 7/2014 | Smith | G01C 21/24 250/203.6 |
| 2019/0316908 | A1 * | 10/2019 | Zhang | B64G 1/361 |

OTHER PUBLICATIONS

Thai, "Applications for FPGAs on Nanosatellites", York Univ., Apr. 2014, 113 pages, in particular pp. 32-43. (Year: 2014).*
Pong, "High-Precision Pointing and Attitude Estimation and Control Algorithms for Hardware-Constrained Spacecraft", Massachusetts Inst, of Technology, Jun. 2014, 254 pages, in particular pp. 51-54, 137-155. (Year: 2014).*
Wei et al., "Star Sensor Calibration Based on Integrated Modelling with Intrinsic and Extrinsic Parameters", Measurement vol. 55, Sep. 2014, pp. 117-125. (Year: 2014).*
Jason R Roberson, "Non-Final Office Action", dated Jul. 27, 2018, U.S. Appl. No. 14/745,875.
ESTCube-1 Wikipedia Page, https://en.wikipedia.org/wiki/ESTCube-1 (last accessed Apr. 24, 2014).
Final Office Action issued in U.S. Appl. No. 14/745,875 dated Dec. 26, 2017.
Geert Smet, et al., "Managing Reaction Wheel Microvibration on a High Resolution EO Small Space Aircraft", European Space Mechanisms & Tribology Symposium, ESTEC, 2013, Noordwijk, The Netherlands.
Jason R. Roberson, "Advisory Action", dated Feb. 22, 2018, U.S. Appl. No. 14/745,875.
Jason R. Roberson, "Non-Final Office Action", dated Jul. 28, 2017, U.S. Appl. No. 14/745,875.
Jason R. Roberson, "Restriction Requirement", dated May 18, 2017 for U.S. Appl. No. 14/745,875.
Space Micro MSS-01,02 Medium Sun Sensors Brochure, http://www.spacemicro.com/assets/datasheets/guidance-and-nav/MSS.pdf (May 2, 2014).
AST Bearings, "Bearings and Related Products and Services", 2012, accessed on the Internet at https://www.astbearings.com/pillow-blocks-flanges.html.
Jason R Roberson, "Final Office Action", dated Feb. 21, 2019, U.S. Appl. No. 14/745,875.
Jason R Roberson, "Notice of Allowance", dated Apr. 19, 2019, U.S. Appl. No. 14/745,875.

* cited by examiner

100
Lens
110
120
Sensor Board
CMOS Sensor
122
Ribbon Cable
GPIO: power, clock
SPI: register access
DCMI: data out
130
140
Processing Board
148
Actel FPGA
142
ARM Micro-processor
FSMC Bus
SRAM (8 MB)
144
FLASH (1 GB)
146
SPI
ADCS
150
5V, 3.3V, 1.5V

200

300

600

700
710
720
Image Data
Catalog Data
730
Lost in Space
731
Select Test Pair Objects
NO
Unused Pairs?
YES
Generate Star Pair Candidates
736
732
Generate Test Rotation
733
Test Rotation Verification
734
Enough Matches?
NO
735
YES
740
Attitude Solution Refinement
750
Final Attitude Solution

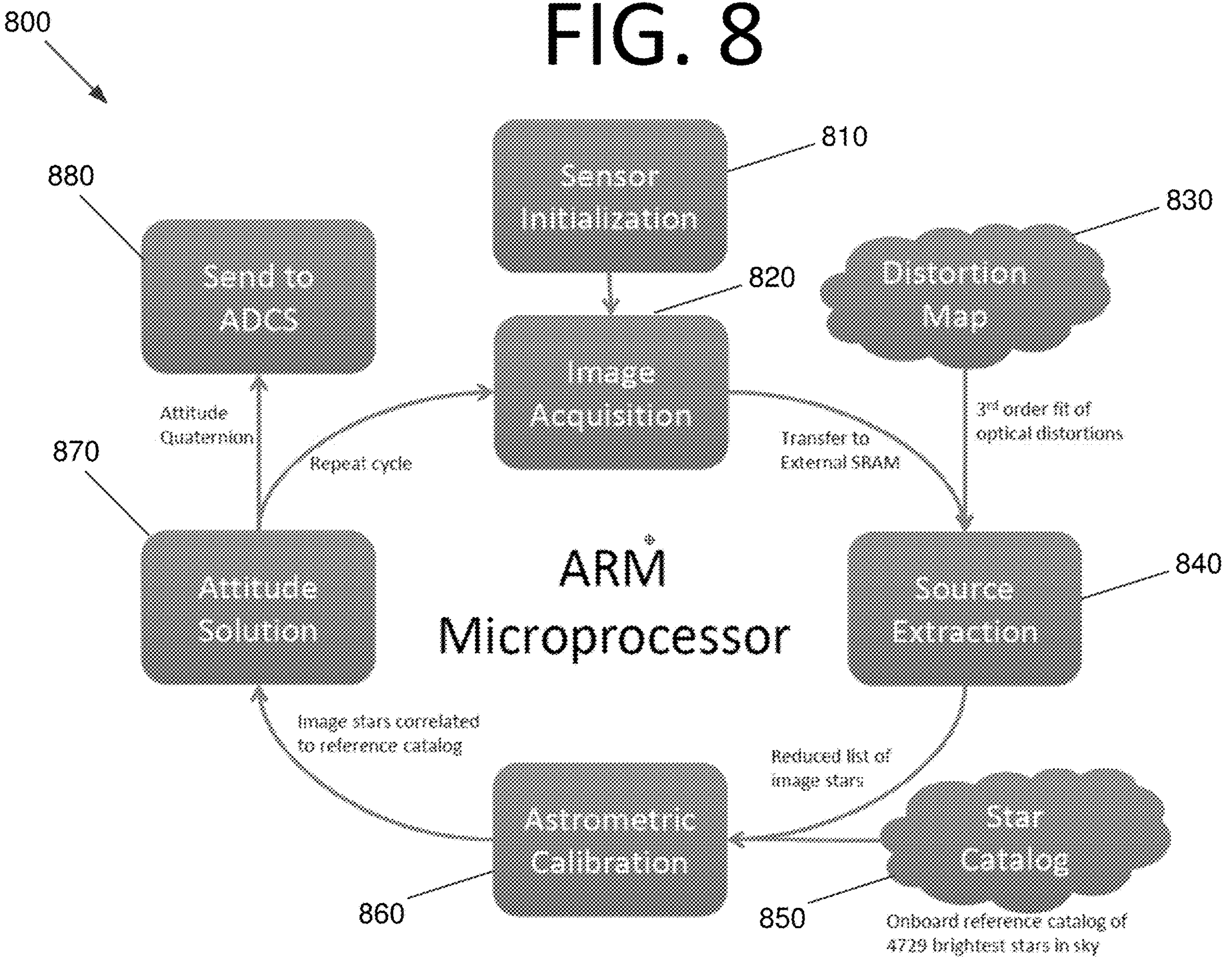
FIG. 8
800
880
Send to ADCS
810
Sensor Initialization
820
Image Acquisition
830
Distortion Map
Attitude Quaternion
Repeat cycle
Transfer to External SRAM
3rd order fit of optical distortions
870
Attitude Solution
ARM® Microprocessor
Source Extraction
840
Image stars correlated to reference catalog
Reduced list of image stars
Astrometric Calibration
Star Catalog
860
850
Onboard reference catalog of 4729 brightest stars in sky

COMPACT STAR-FIELD SENSOR (SFS)

CROSS-REFERENCE TO RELATED APPLICATION

This application claims the benefit of U.S. Provisional Patent Application No. 62/540,256 filed Aug. 2, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to positional sensing, and more particularly, to a compact star-field sensor that is capable of performing lost in space attitude determination.

BACKGROUND

In order to obtain their positions, space vehicles may employ a star-field sensor (SFS) that captures an image of the stars within a given field of view (FOV), then compares the pattern of the objects in the image with a catalog of stars stored onboard the space vehicle. Once the stars in the FOV have been identified, the space vehicle is able to determine its position based on the known locations of the stars. This approach allows for "lost in space" attitude determination, where no a priori position knowledge is required for a solution to be found.

The main advantage of a SFS over other types of attitude determination is the precision of the result, which can be within arcminutes of the true solution. A drawback is the time to obtain that solution, since the SFS requires image collection, object extraction, catalog searching, and result verification, causing the known position to lag the current position.

Small space vehicles, such as CubeSats, have become increasingly capable in recent years. However, as small space vehicle mission complexity increases, the need for accurate attitude knowledge to assist in attitude control maneuvers becomes more prevalent. While other SFSs have been developed, existing SFS technology typically is not capable of being deployed in small space vehicles and achieving the requisite accuracy. Accordingly, a compact star-field sensor (SFS) that provides accurate attitude information to facilitate proper pointing of a high gain antenna, for example, may be beneficial.

SUMMARY

Certain embodiments of the present invention may provide solutions to the problems and needs in the art that have not yet been fully identified, appreciated, or solved by conventional star sensing solutions. For example, some embodiments pertain to a compact SFS that can be deployed in small space vehicles, such as a 1.5U CubeS at. The hardware, software, catalogs, and calibration algorithm of the SFS provide highly accurate attitude information that can be used for pointing.

In an embodiment, an SFS includes a lens and an image sensor board that includes an image sensor. The image sensor is configured to receive light from the lens and produce an image from the received light. The SFS also includes a processing board configured to communicate with the image sensor board. The processing board includes a processor configured to control the SFS and an FPGA configured to provide interfaces to communicate with devices that are external to the SFS and to provide clocks and power to the image sensor board.

In another embodiment, a method for determining a star-field implemented by an SFS includes determining, by the SFS, a noise threshold of an image by finding a median pixel value of a representative portion of the image as a noise floor and setting a noise threshold at a predetermined level above the noise floor, by the SFS. In some embodiments, the noise threshold is set at least 3-sigma above the noise floor. The method also includes scanning the image, by the SFS, for sources and pixels of the image that are below the noise threshold, and classifying pixels above the noise threshold as source pixels, by the SFS.

In yet another embodiment, an SFS includes a processor. The processor is configured to determine a noise threshold of an image by finding a median pixel value of a representative portion of the image as a noise floor and set a noise threshold at a predetermined level above the noise floor. The processor is also configured to scan the image for sources and pixels of the image that are below the noise threshold and classify pixels above the noise threshold as source pixels. When a source pixel is adjacent to a pixel from a previously detected source, the processor is further configured to add the adjacent source pixel to the previously detected source. When the source pixel borders two existing sources, the processor is further configured to merge the two existing sources and add the source pixel that borders the two existing sources to the merged source. When the source pixel does not border a known source, the processor is further configured to create a new source.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8 is a flow diagram illustrating operation of an SFS, according to an embodiment of the present invention.

DETAILED DESCRIPTION OF THE EMBODIMENTS

Figure 1:
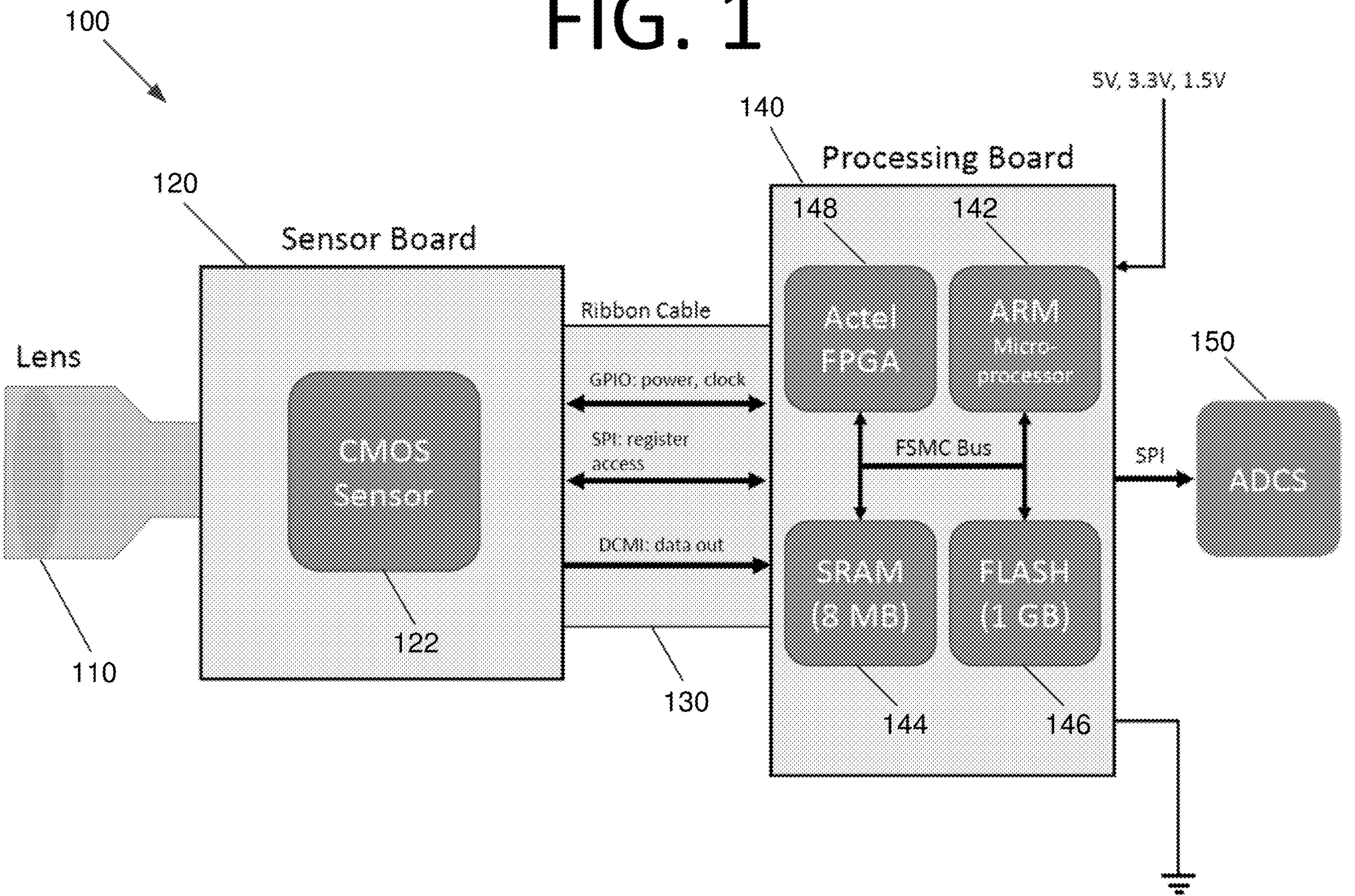
FIG. 1 is an architectural diagram illustrating a SFS, according to an embodiment of the present invention.

Some embodiments of the present invention pertain to a compact SFS that can be deployed in small space vehicles, such as a 1.5U CubeSat. Such embodiments may have a small size, weight, and low power requirements. The hardware, software, catalogs, and calibration algorithm of the SFS provide highly accurate attitude information that can be used for pointing. For instance, some embodiments provide accurate attitude determination that supports pointing of a deployable high gain helical antenna. A full "lost in space" attitude solution is accomplished in under a minute in some embodiments. This solution may be accurate to approximately an arcminute with no a priori attitude information. The SFS may be fully reprogrammable on orbit, allowing continued algorithm development and deployment after launch.

Hardware Design

The SFS design uses an image sensor. For instance, some embodiments utilize a Python™ 1300 image sensor from ON Semiconductor™. This image sensor is a high-sensitivity monochrome complementary metal-oxide-semiconductor (CMOS) chip with a 1280×1024 pixel array, or 1.3 megapixels (Mpix). Each pixel on the CMOS array has a microlens for improved sensitivity of the individual photodiodes. The image sensor may be mounted on a custom-designed circuit board attached to a standard "S-mount" threaded bracket.

A lens is used to focus light onto the image sensor. For instance, some embodiments use the 4300 series 16 mm focal length S-mount lens available from Marshall Electronics, Inc.™ This lens has three elements and a focal ratio of 2.0. The resulting field of view on the CMOS sensor is 21.7×17.5 degrees using the Python™ image sensor and the 4300 series lens. The lens may be focused before launch using a test target at a suitable distance (e.g., approximately 10 meters). The fixture holding the lens may be clamped using a set screw and then staked with epoxy before final installation into the space vehicle.

The lens may be swappable in some embodiments. For instance, lenses with different FOVs may be employed for different missions. An increased FOV may provide for easier lost in space identification, but provide poorer accuracy, whereas a lens with a smaller FOV provides improved accuracy, but may potentially complicate the identification algorithm. The SFS lens is swappable in some embodiments because the mounting bracket has a M12-0.5 mm threaded hole that accepts standard S-mount lenses. There are a number of standard focal lengths available and the mounting bracket can accept any standard lens size from 2 mm to 35 mm focal length (possibly 50 mm with minor modifications) in some embodiments.

The SFS module in some embodiments is controlled by a 32-bit ARM Cortex-M4™ processor clocked at 168 MHz with 1 megabyte (MB) of flash memory. The processor may be attached to an external SRAM chip providing an additional memory (e.g., 8 MB) and an external flash chip providing storage (e.g., 1 GB). The processor may also be paired with a field-programmable gate array (FPGA), such as the ProASIC™ A3P1000 from Microsemi™. The FPGA may provide interfaces to external communication and to the image sensor, and provide clocks and power control to the image sensor. Additionally, the FPGA may provide watchdog timers that will reboot the processor if there is a system fault. This hardware configuration provides isolation from other components, assurance, and reliability.

The image sensor may be connected to a digital camera interface (DCMI) on the ARM processor, which reads the image 10 bits at a time. The image sensor may also be replaced without redesigning the hardware, making it upgradable and modular. Also, the image sensor may have a different protocol since the ARM processor, for instance, can provide various interface signals.

The image data is transferred to external SRAM as it is read out. Although the DCMI interface is capable of reading out the CMOS sensor at up to 54 MHz in some embodiments, the interface may be slowed (e.g., down to 2.84 MHz) due to memory errors that may occur when transferring the image to the external SRAM. As a result, full image readout takes about 2.4 seconds using the hardware discussed here.

FIG. 1 is an architectural diagram illustrating a SFS 100, according to an embodiment of the present invention. SFS 100 includes a lens 110 that allows external light from stars to enter SFS 100 and contact a sensor board 120. Sensor board 120 has a CMOS image sensor 122 that generates electrical signals when light strikes its pixels. A ribbon cable 130 provides power, general purpose input/output (GPIO) signals (e.g., clock), and SPI (e.g., register access) to/from sensor board 120, as well as providing DCMI data from sensor board 120.

SFS also includes a processing board 140 that controls operation of SFS 100. Processing board 140 includes a 32-bit ARM processor 142 that includes internal flash memory (not shown). Processor 142 is connected via an FSMC bus to external SRAM 144 chip providing an additional 8 MB of memory and external flash 146 providing 1 GB of storage. Processor is also paired with a FPGA 148 that provides interfaces to external communication and to image sensor board 120. FPGA 148 also provides clocks and power control to image sensor board 120. Additionally, FPGA 148 may provide watchdog timers that will reboot the processor if there is a system fault. Processing board 140 is connected to an attitude determination and control system (ADCS) 150 via SPI. The ADCS may use attitude information from SFS 100 to assist in determining and carrying out attitude corrections.

Software Design

Figure 2:
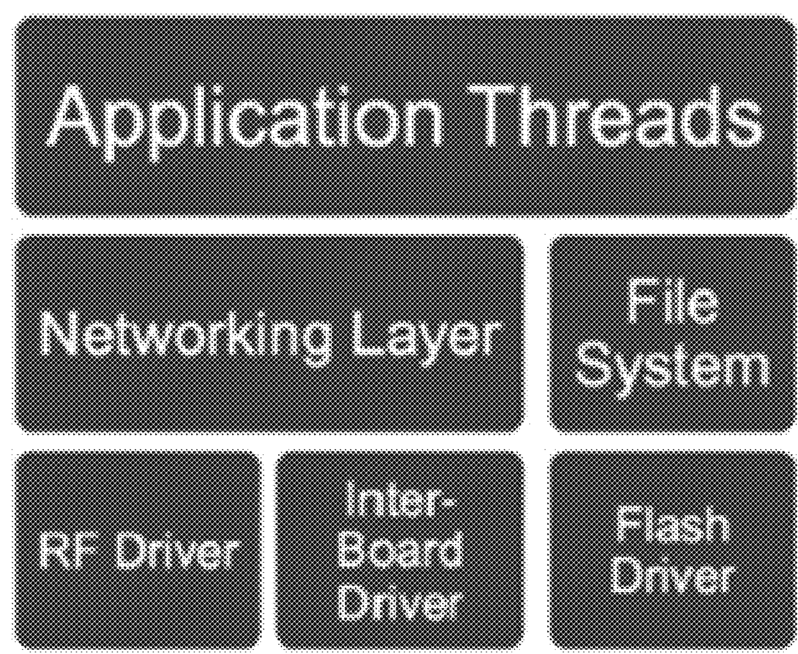
FIG. 2 illustrates a real-time operating system (RTOS) architecture.

The ARM processor of some embodiments runs a real-time operating system (RTOS), such as that provided by ARM's Keil™ MDK development package. FIG. 2 illustrates an RTOS architecture 200. Internal flash memory of the ARM processor is divided into three banks in an embodiment. Bank 0 is 208 MB in size and holds the recovery code that is loaded prior to launch. The Bank 0 code is not intended to be modified after launch and represents the safe recovery mode after a system reset. The other two banks, A and B, are each 384 MB in size and contain the operational flight code that can be updated while on-orbit. Code updates are loaded onto Banks A and B in an alternating manner. The system of alternating updates facilitates easy fallback to the previous version if there is a problem with the most recent code update.

The flight control code was written in the C programming language in this embodiment. However, any suitable programming language may be used without deviating from the scope of the invention. The SFS uses a set of code libraries for performing operating system functions, filesystem operations, inter-board communications, and common user interface functions in this embodiment.

Additionally, a software library, NavLib, was developed that contains functions for performing common mathematical operations, such as linear algebra, orbit determination, astronomical ephemeris, and statistical modeling. The code base is maintained within a revision control system.

Attitude Determination Algorithm

The attitude determination algorithm for the SFS takes place in three steps in some embodiments. First, the image is acquired and read into memory. Second, the image is scanned for stars and an object list is produced that provides the image coordinates and brightness in pixel counts of each star that was found. Finally, the extracted object list is calibrated against a known star catalog and the rotation from the body to inertial coordinates is determined.

Image Extraction

After an image has been acquired, it must be transformed into a list of stars—a process called “extraction” herein. The first step in the extraction process of some embodiments is to determine the noise threshold of the image. This may be accomplished by finding the median pixel value of a representative portion of the image. This may be assumed to be the noise floor of the image and the standard deviation of the noise may be assumed to be square-root of the noise level in some embodiments. The threshold may then be set at 3-sigma above the noise floor.

The next step in the extraction process of some embodiments is to scan the image for sources. As the image is scanned, pixels below the threshold value are discarded. Any pixel above the threshold value is considered a “source” pixel. If a source pixel is adjacent to a pixel from a previously detected source, it may be added to that source. If the source pixel borders two existing sources, those sources may be merged and the pixel may be added to the merged source. Finally, if the source pixel does not border a known source, a new source may be created.

This method of source extraction is expected to handle some image smear due to spacecraft rotation during the image exposure. The level of smear that can be tolerated has yet to be experimentally determined via on orbit testing. For each resulting source, the image coordinates of the centroid may be determined using a weighted mean:

$$x = \frac{\sum (x_i * c_i)}{\sum (c_i)} \tag{1}$$

$$y = \frac{\sum (y_i * c_i)}{\sum (c_i)} \tag{2}$$

where $x_i$ and $y_i$ are the individual pixel coordinates and $c_i$ is the source counts above the image noise floor for that individual pixel.

The resulting object list contains image coordinates for each extracted star, as well as the total source counts above the noise level and the number of pixels that the source occupied. In an implemented embodiment, the image extraction process takes approximately 6.7 seconds for the full 1.3 Mpix image.

Star Catalog

One of the significant software components of the SFS is the star catalogs, which provide a reference of known star locations to compare to the objects detected in the camera images. The primary constraint on the star catalogs was size with a lesser emphasis on how the stars would be sorted since the order can be altered on orbit. Larger catalogs take longer to cycle through, increasing the run time of the algorithm while it searches for the stars captured in the image, while smaller catalogs may not contain sufficient information for the true solution to be included.

A compilation of star catalogs is used in some embodiments, such as the Tycho-2 catalog combined with the Tycho-2 Supplement 1 and Yale Bright Star catalogs to ensure a sufficiently large number of stars with the appropriate entry data. The brightest stars available may be selected to attain the best signal-to-noise ratio (SNR) and improve the chance they will be observed in the image. For celestial objects, magnitude of brightness may be measured on a negative logarithmic scale, following the relationship:

$$M_V = M_{V,1} - M_{V,0} = -2.5 \log(F_1/F_0) \tag{3}$$

where $M_V$ is the reported magnitude of the star, $M_{V,1}$ is the overall magnitude, $M_{V,0}$ is the reference magnitude (Vega=0), $F_1$ is the observed flux, and $F_0$ is the reference flux for the optical setup.

Three catalogs were developed to meet different needs of some embodiments.

The Complete Catalog: The Complete Catalog, used as a gold standard onboard the space vehicle, includes all stars with magnitude of brightness (MV) less than 10.0 and is sorted by ascending magnitude (descending brightness). This catalog includes information about the magnitude, magnitude error, J2000 Equinox position, and proper motion for each of the 362,101 stars, resulting in a binary file size of 7.24 MB. While this catalog is not directly used by the calibration algorithm of some embodiments, the other two catalogs were both generated from the Complete Catalog and future catalogs may be generated onboard the space vehicle from this catalog. The complete catalog may be stored prior to launch such that it is available on-orbit (reduced by thresholding at a conservative level) so it can be reprocessed on orbit to support experimentation with different algorithms without requiring the full catalog to be uploaded.

The Reduced Catalog: The Reduced Catalog contains 4,729 stars with positions corrected for proper motion for the epoch of Jan. 1, 2018. The size of the catalog is reduced to 75.66 kB by including only the magnitude and Cartesian position of each star. The magnitude cutoff for this catalog is 6.0, a selection based on the sensitivity of the optical equipment of a deployed embodiment considering an exposure time of 200 ms. The Reduced Catalog provides indexed star data for look-up by the calibration algorithm once a specific star pair has been selected as a potential match.

The Search Catalog: The Search Catalog enables the calibration algorithm to match potential object pairs to corresponding stars by comparing the spherical distance between vectors. Each entry includes the Reduced Catalog index of two stars and the angle between them. The magnitude cutoff for this catalog is 5.0 and angle of separation cutoff is 17 degrees, resulting in a catalog size of 24,787 star pairs (297.44 kB).

Figure 3:
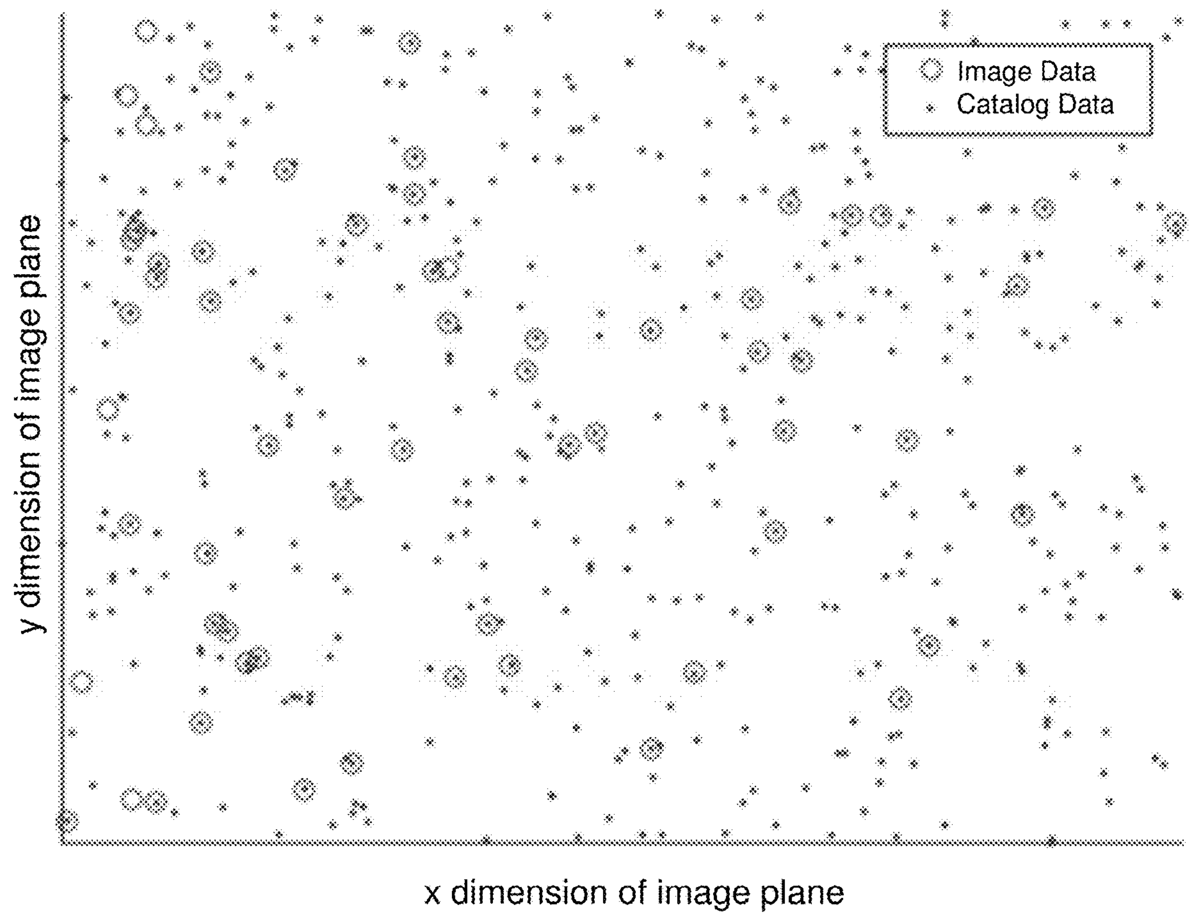
FIG. 3 illustrates a mapping of the objects extracted from a single SFS image and the catalog stars plotted as they would be seen by the camera for a single exposure, according to an embodiment of the present invention.

FIG. 3 shows a mapping 300 of the objects extracted from a single SFS image and the catalog stars plotted as they would be seen by the camera for a single exposure. The encircled stars represent catalog matches that can be used for rotation verification in the search algorithm. The image objects that do not encircle a catalog star are counted as misses and reduce the chance that the rotation will be selected. Only catalog stars brighter than magnitude 8 were included in this figure to improve clarity.

Distortion Map

Figure 4:
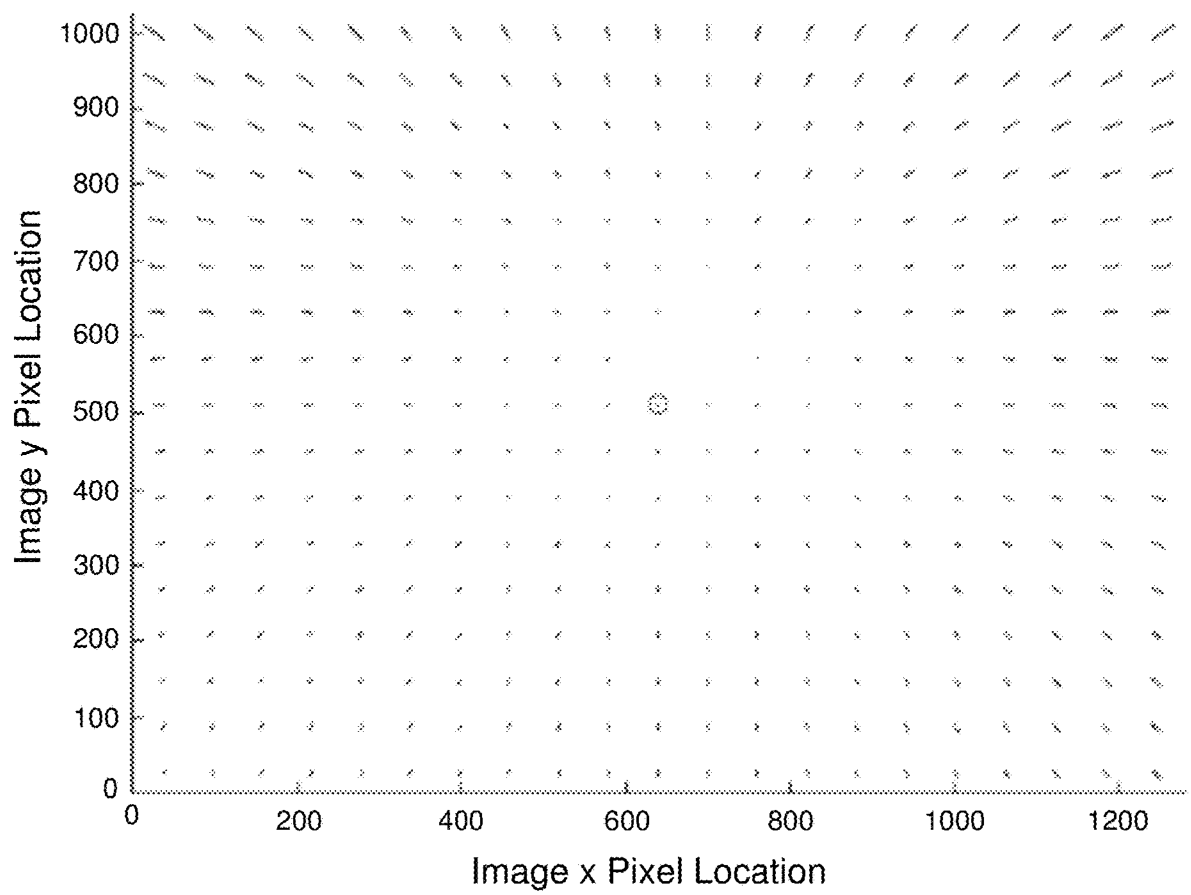
FIG. 4 illustrates an exaggerated representation of the distortion effects, according to an embodiment of the present invention.

While the optical performance of the lens used for the SFS is very good, it is not perfectly rectilinear. There is a non-uniform radial distortion to the images produced by the optical system that should be corrected before the images are calibrated to the star catalog. A two-dimensional $3^{rd}$ order polynomial fit is employed in some embodiments to correct the optical distortions and place the detected objects on a normalized tangential sky projection. FIG. 4 shows an exaggerated representation 400 of the distortion effects.

Figure 5:
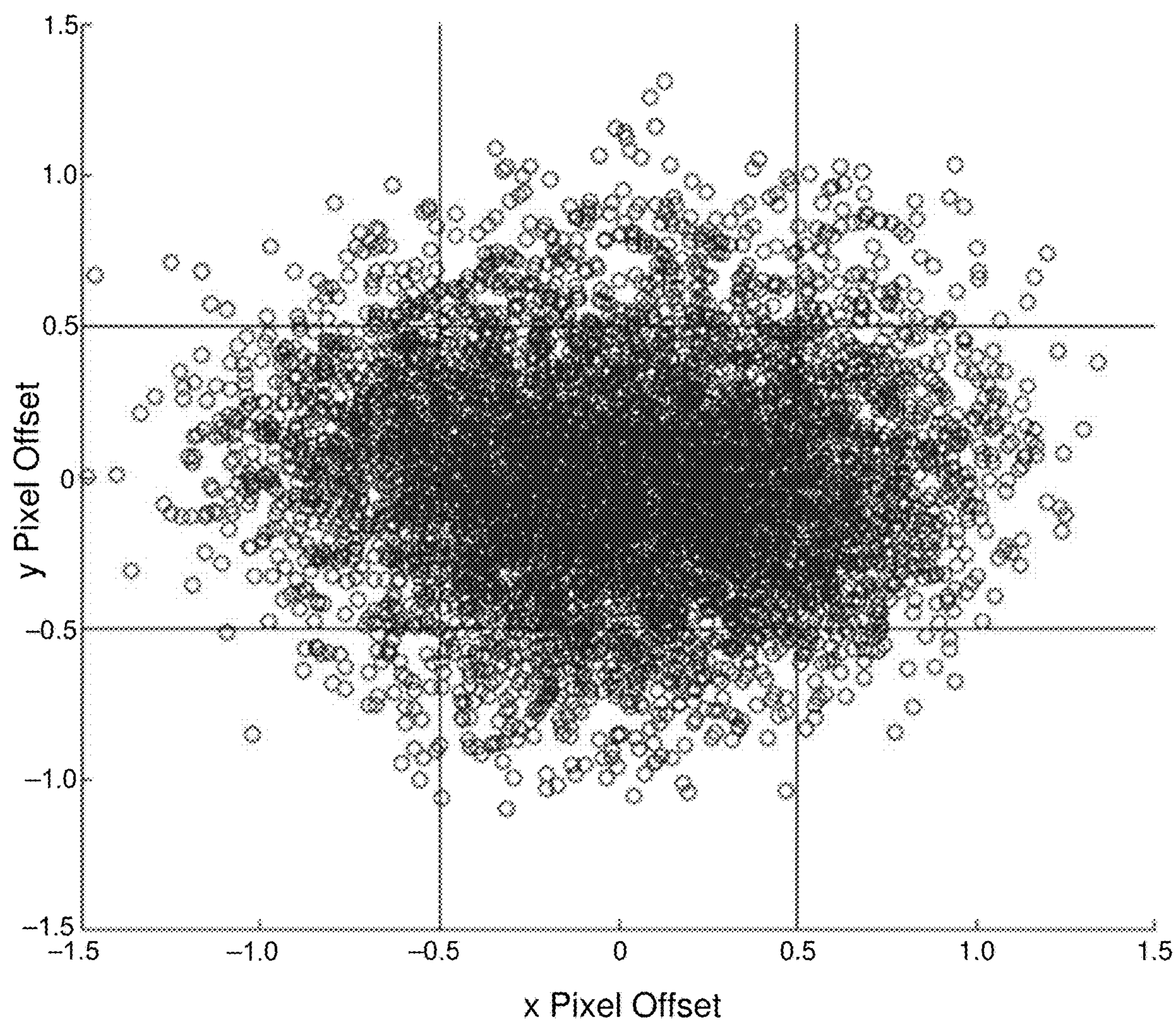
FIG. 5 shows the fit residuals between catalog and measured stars at the pixel level after distortion correction has been applied, according to an embodiment of the present invention.

The optical distortion changes slightly between the different SFS modules. The distortion is dependent on focus, optical alignment, and individual lens characteristics. A generic distortion map is generally adequate to allow successful calibration of the SFS solutions. However, a distortion map that is made specifically for each optical system improves the calibration accuracy and increases the likelihood of a successful match. A camera-specific distortion map may be made by fitting all of the calibrated objects found in several images to a standard tangential reference plane. FIG. 5 shows fit residuals 500 between catalog and measured stars at the pixel level after distortion correction has been applied.

Figure 6:
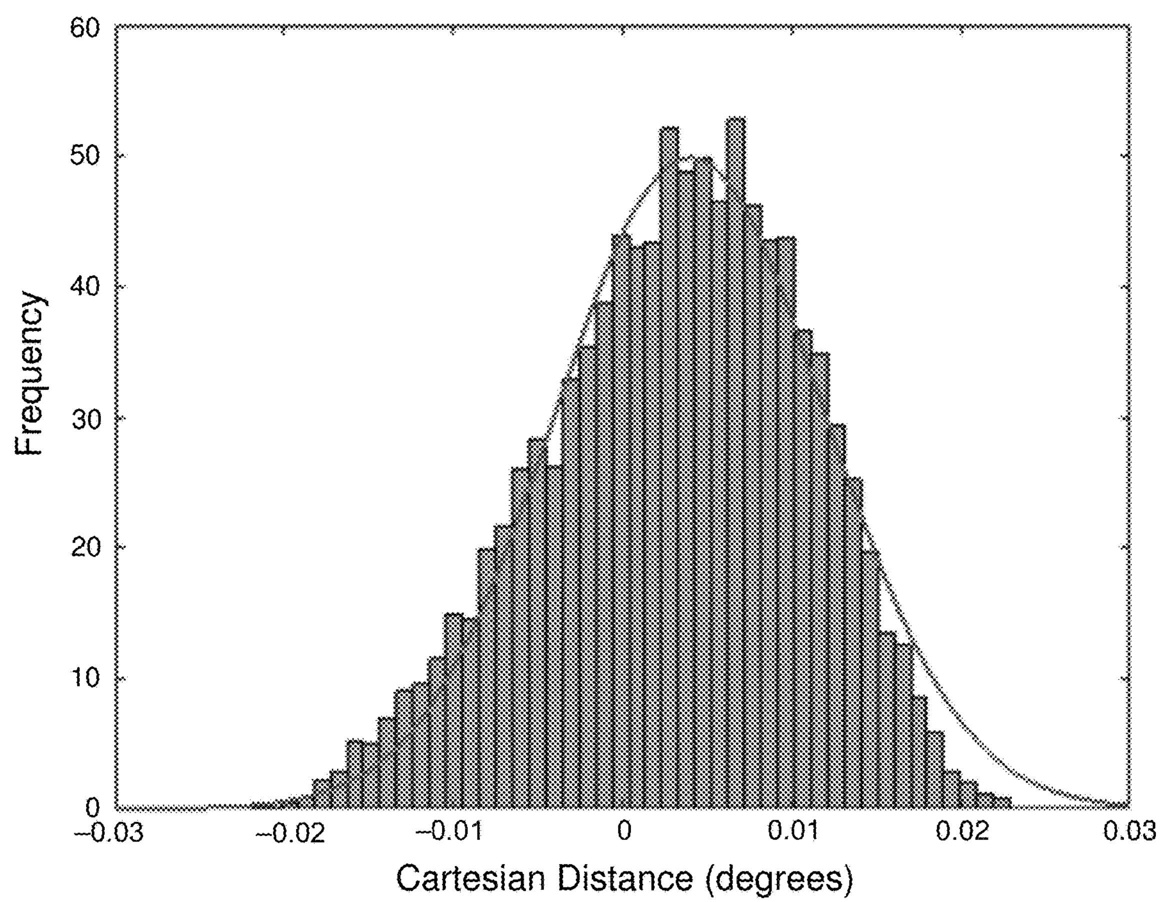
FIG. 6 is a graph illustrating a point spread function of fit residuals, according to an embodiment of the present invention.

The point spread function of the fit residuals was plotted using a probability density function (see graph 600 of FIG. 6), and the full width at half maximum (FWHM) was computed to determine the error associated with the distortion. FWHM is approximately 0.01884 degrees (1.10 pixels), indicating the distortion error is about 1.13 arcminutes.

Image Calibration

Figure 7:
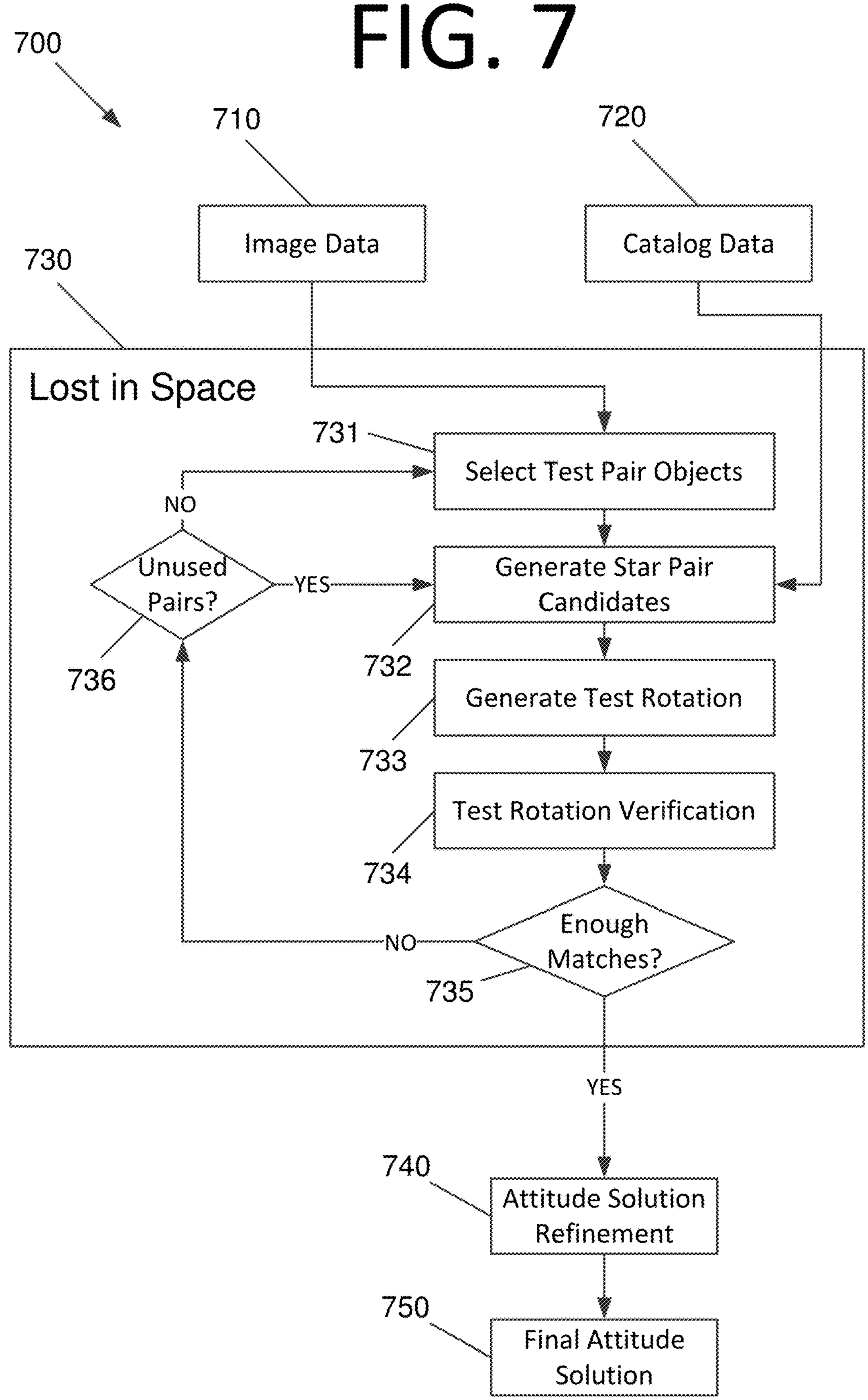
FIG. 7 is a block diagram illustrating a calibration algorithm, according to an embodiment of the present invention.

While there are several methods which can be used to derive the space vehicle's attitude from the sensor image, some embodiments combine the TRIAD and Quaternion Estimation (QUEST) algorithms to generate a fast and precise attitude solution. FIG. 7 is a block diagram 700 illustrating a calibration algorithm, according to an embodiment of the present invention. The objects identified in the image are sorted by brightness using the number of counts recorded by the image sensor and provided to lost in space algorithm 730 as image data 710. This enables the brightest objects (i.e., those with the best SNR) to be tested first. A test pair of image objects is selected at 731, and is constrained to be within 13° of the center of the image. False objects not in the catalog, such as planets or hot pixels, are rejected by iterating through object pairs if a solution is not found. The object pair selected at this step is defined to be in SFS body coordinates.

Catalog data 720 from the Search Catalog is also provided to lost in space algorithm 730 and used to generate a list of all the star pairs which have nearly the same angle of separation as the selected object test pair at 732. This smaller sub-catalog reduces the search time for each subsequent iteration. A star pair from the candidate list is selected as a potential match to the observed objects.

The initial test rotation is determined with the TRIAD algorithm and generated at 733, which quickly returns a rough conversion from the SFS body coordinates to inertial coordinates. The rotational focus may be adjusted prior to flight to control the amount of intentional "blur" for centroiding. The lenses may be focused manually in some embodiments using a focus target an appropriate distance away (e.g., approximately 40 feet away). The focus may be performed by rotating the lens in a screw mount until the test target has the best resolution clarity. The lens may deliberately be left slightly de-focused to help with star identification. However, operating at the best possible focus improves the detection sensitivity.

The TRIAD algorithm uses two stars in each coordinate system to find two rotation components that enable a complete mapping of all the stars in the FOV. In order to verify that the test rotation is correct at 734, it is applied to the remaining stars in the FOV. The rotated stars are then compared to the stars expected to be within the FOV from the Reduced Catalog at 735. If the angle between an image star and the catalog star is less than 0.001 radians, the star is considered a hit. If the rotation has at least 5 hits at 735, the solution is accepted. Otherwise, the star pair candidates were incorrect and a new rotation needs to be tried. If there are unused candidate pairs at 736, the process returns to step 732 to select a new star pair candidate to generate a new test rotation. Otherwise, the process returns to step 731.

Once the rough test rotation has been verified at 735, the QUEST algorithm is applied to the coarse image/catalog star matches to generate a more finely tuned rotation solution at 740. QUEST operates by applying a least squares fit to all the matches to generate the rotation rather than using only two stars, thereby including more of the image information in the attitude solution. A final attitude solution results at 750, which is saved and used in the next SFS measurement to select the correct stars from the catalog at the beginning of the calibration, significantly improving the calibration time.

FIG. 8 is a flow diagram 800 illustrating operation of an SFS, according to an embodiment of the present invention. The SFS is initialized at 810 and an image is acquired at 820. This image is transferred to external SRAM, and the acquired image information, along with a distortion map 830 with a $3^{rd}$ order fit of optical distortions, are used to perform source extraction at 840, which produces a reduced list of image stars.

This reduced list of image stars, along with a star catalog 850 (an onboard reference catalog of the 4,729 brightest stars in the sky in this embodiment) are used to perform astrometric calibration at 860. Image stars that are correlated to star catalog 850 are then used to compute a final attitude solution at 870, which includes an attitude quaternion. The attitude quaternion is then sent to the ADCS at 880.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A star-field sensor (SFS), comprising:
- a lens;
- an image sensor board comprising an image sensor, the image sensor configured to receive light from the lens and produce an image from the received light; and
- a processing board configured to communicate with the image sensor board, the processing board comprising:
  - a processor configured to control the SFS, and
  - a field programmable gate array (FPGA) configured to provide interfaces to communicate with devices that are external to the SFS and to provide clocks and power to the image sensor board.

2. The SFS of claim 1, wherein the FPGA is further configured to provide watchdog timers that reboot the processor when a system fault occurs.

3. The SFS of claim 1, wherein the image sensor board is connected to a digital camera interface (DCMI) on the processor that reads images produced by the image sensor board.

4. The SFS of claim 1, wherein the processor is configured to:
- determine a noise threshold of an image by finding a median pixel value of a representative portion of the image as a noise floor;
- set a noise threshold at a predetermined level above the noise floor;
- scan the image for sources and pixels of the image that are below the noise threshold; and
- classify pixels above the noise threshold as source pixels.

5. The SFS of claim 4, wherein the noise threshold is set at least 3-sigma above the noise floor.

6. The SFS of claim 4, wherein when a source pixel is adjacent to a pixel from a previously detected source, the processor is further configured to add the adjacent source pixel to the previously detected source.

7. The SFS of claim 4, wherein when a source pixel borders two existing sources, the processor is further configured to:
- merge the two existing sources; and
- add the source pixel that borders the two existing sources to the merged source.

8. The SFS of claim 4, wherein when a source pixel does not border a known source, the processor is further configured to create a new source.

9. The SFS of claim 4, wherein the processor is further configured to:
- for each resulting source, determine image coordinates of a centroid using a weighted mean given by:

$$x = \frac{\sum (x_i * c_i)}{\sum (c_i)}$$

$$y = \frac{\sum (y_i * c_i)}{\sum (c_i)}$$

- where $x_i$ and $y_i$ are individual pixel coordinates and $c_i$ is source counts above the image noise floor for that individual pixel; and
- produce an object list that comprises image coordinates for each extracted star, total source counts above the noise threshold, and a number of pixels that the source occupied.

10. The SFS of claim 4, wherein the processor is further configured to:
- use a compilation of star catalogs; and
- select a predetermined number of brightest stars available to attain a best signal-to-noise ratio (SNR) and improve a chance that the brightest stars available will be observed in the image.

11. The SFS of claim 10, wherein the predetermined number of brightest stars available are determined by a magnitude of brightness, measured on a negative logarithmic scale according to:

$$M_V = M_{V,1} - M_{V,0} = -2.5 \log(F_1/F_0)$$

- where $M_V$ is a reported magnitude of a star, $M_{V,1}$ is an overall magnitude, $M_{V,0}$ is a reference magnitude with Vega=0, $F_1$ is an observed flux, and $F_0$ is a reference flux for optical setup.

12. The SFS of claim 4, wherein the processor is further configured to:
- employ a two-dimensional $3^{rd}$ order polynomial fit to correct optical distortions and place detected objects on a normalized tangential sky projection.

13. The SFS of claim 4, wherein the processor is further configured to:
- derive attitude using a combination of algorithms as a calibration algorithm to generate a fast and precise attitude solution.

14. A method for determining a star-field implemented by a star-field sensor (SFS), comprising:
- determining, by the SFS, a noise threshold of an image by finding a median pixel value of a representative portion of the image as a noise floor;
- setting a noise threshold at a predetermined level above the noise floor, by the SFS;
- scanning the image, by the SFS, for sources and pixels of the image that are below the noise threshold; and classifying pixels above the noise threshold as source pixels, by the SFS.

15. The method of claim 14, wherein when a source pixel is adjacent to a pixel from a previously detected source, the method further comprises adding the adjacent source pixel to the previously detected source, when the source pixel borders two existing sources, the method further comprises merging the two existing sources, by the SFS, and adding the source pixel that borders the two existing sources to the merged source, by the SFS, and when the source pixel does not border a known source, the method further comprises creating a new source, by the SFS.

16. The method of claim 14, further comprising:

for each resulting source, determining, by the SFS, image coordinates of a centroid using a weighted mean given by:

$$x = \frac{\sum (x_i * c_i)}{\sum (c_i)}$$

$$y = \frac{\sum (y_i * c_i)}{\sum (c_i)}$$

where $x_i$ and $y_i$ are individual pixel coordinates and $c_i$ is source counts above the image noise floor for that individual pixel; and producing an object list, by the SFS, that comprises image coordinates for each extracted star, total source counts above the noise threshold, and a number of pixels that the source occupied.

17. The method of claim 14, further comprising:

using a compilation of star catalogs, by the SFS; and selecting a predetermined number of brightest stars available, by the SFS, to attain a best signal-to-noise ratio (SNR) and improve a chance that the brightest stars available will be observed in the image, wherein the predetermined number of brightest stars available are determined by a magnitude of brightness, measured on a negative logarithmic scale according to:

$$M_V = M_{V,1} - M_{V,0} = -2.5\ \log(F_1/F_0)$$

where $M_V$ is a reported magnitude of a star, $M_{V,1}$ is an overall magnitude, $M_{V,0}$ is a reference magnitude with Vega=0, $F_1$ is an observed flux, and $F_0$ is a reference flux for optical setup.

18. The method of claim 14, further comprising:

employing a two-dimensional 3rd order polynomial fit, by the SFS, to correct optical distortions and place detected objects on a normalized tangential sky projection.

19. A star-field sensor (SFS), comprising:

a processor configured to:

determine a noise threshold of an image by finding a median pixel value of a representative portion of the image as a noise floor;

set a noise threshold at a predetermined level above the noise floor;

scan the image for sources and pixels of the image that are below the noise threshold; and classify pixels above the noise threshold as source pixels, wherein when a source pixel is adjacent to a pixel from a previously detected source, the processor is further configured to add the adjacent source pixel to the previously detected source, when the source pixel borders two existing sources, the processor is further configured to merge the two existing sources and add the source pixel that borders the two existing sources to the merged source, and when the source pixel does not border a known source, the processor is further configured to create a new source.

20. The SFS of claim 19, wherein the processor is further configured to:

for each resulting source, determine image coordinates of a centroid using a weighted mean given by:

$$x = \frac{\sum (x_i * c_i)}{\sum (c_i)}$$

$$y = \frac{\sum (y_i * c_i)}{\sum (c_i)}$$

where $x_i$ and $y_i$ are individual pixel coordinates and $c_i$ is source counts above the image noise floor for that individual pixel; and produce an object list that comprises image coordinates for each extracted star, total source counts above the noise threshold, and a number of pixels that the source occupied.

* * * * *